United States Patent Office 3,201,304
Patented Aug. 17, 1965

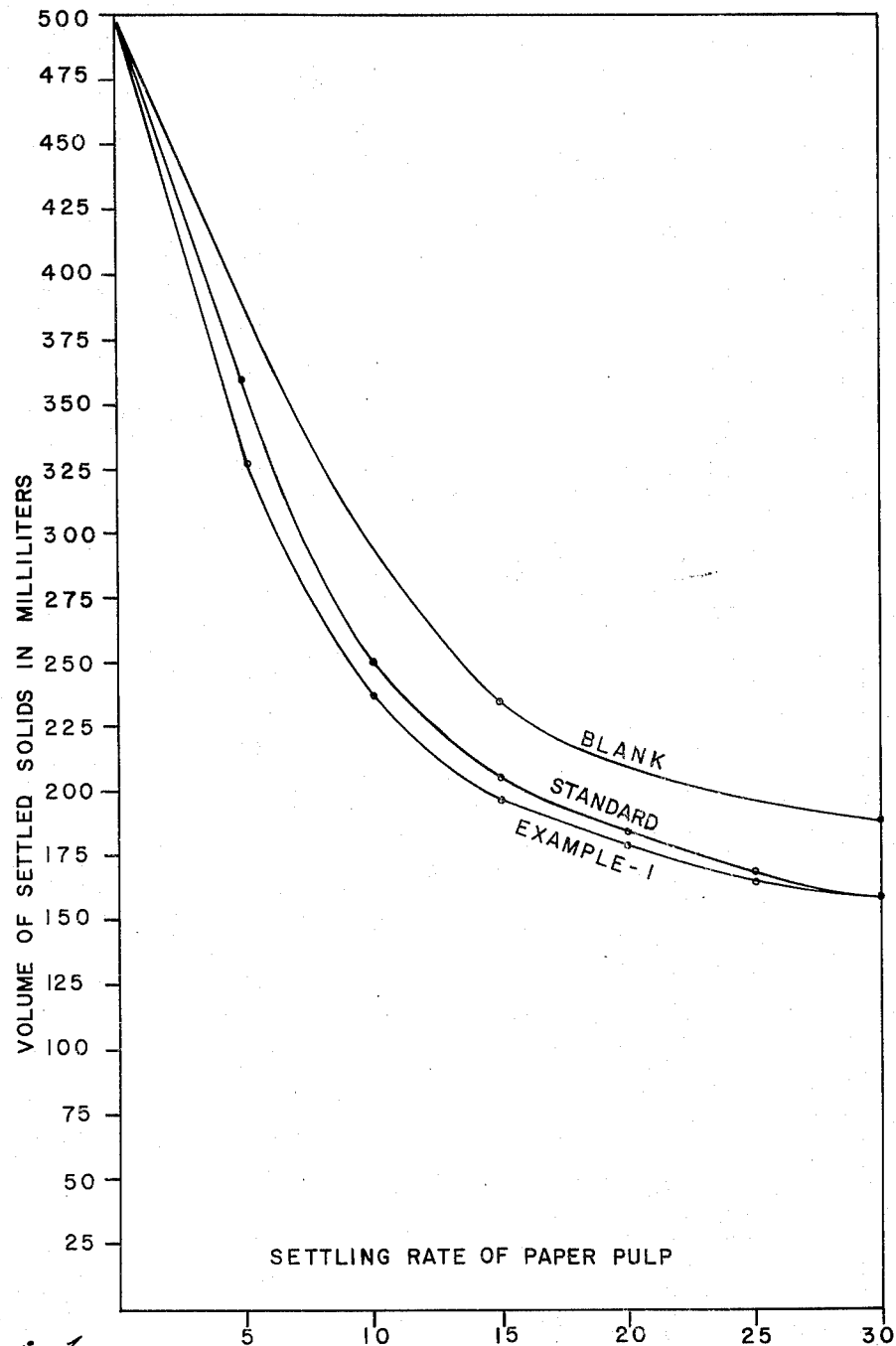

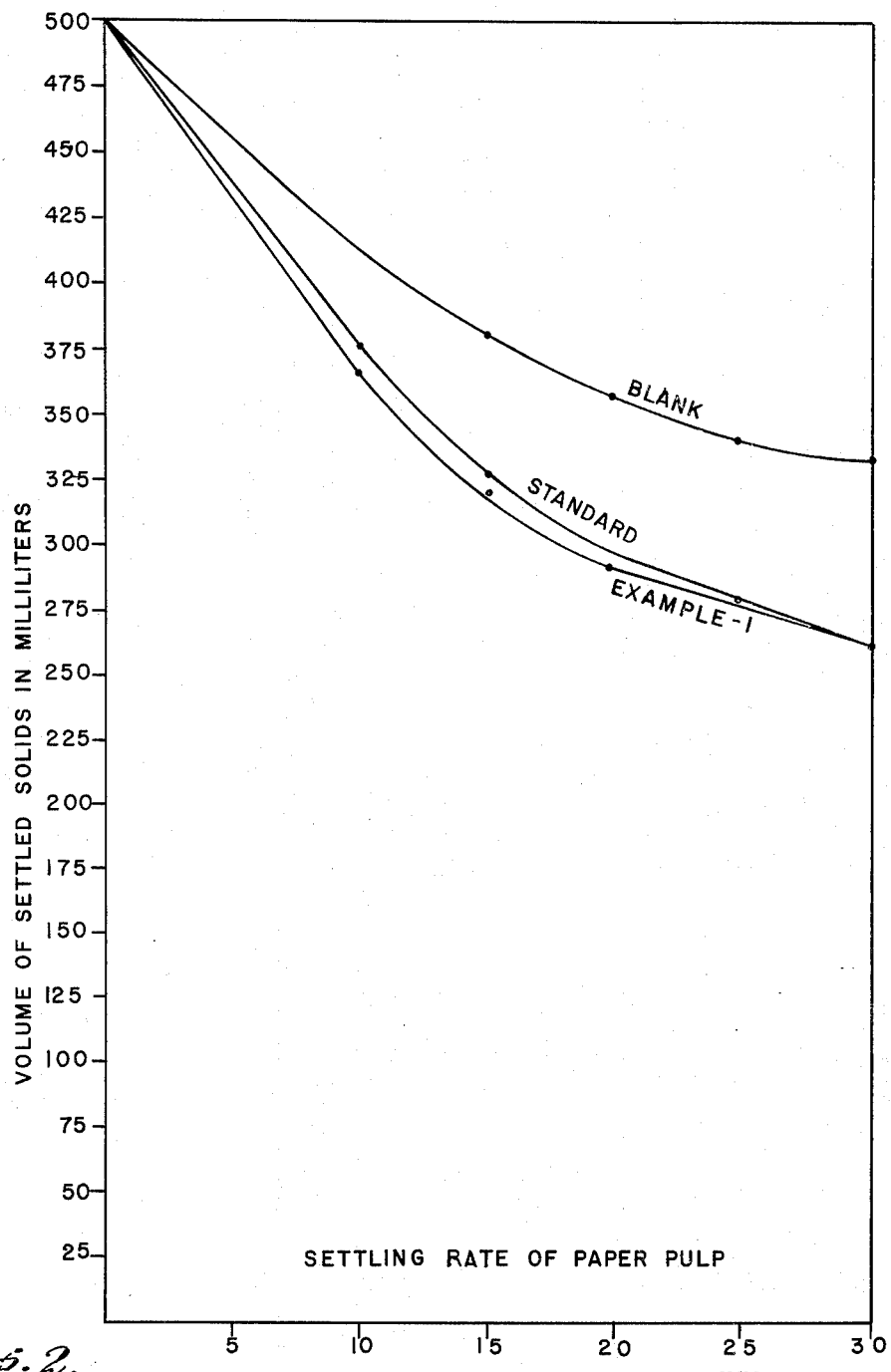

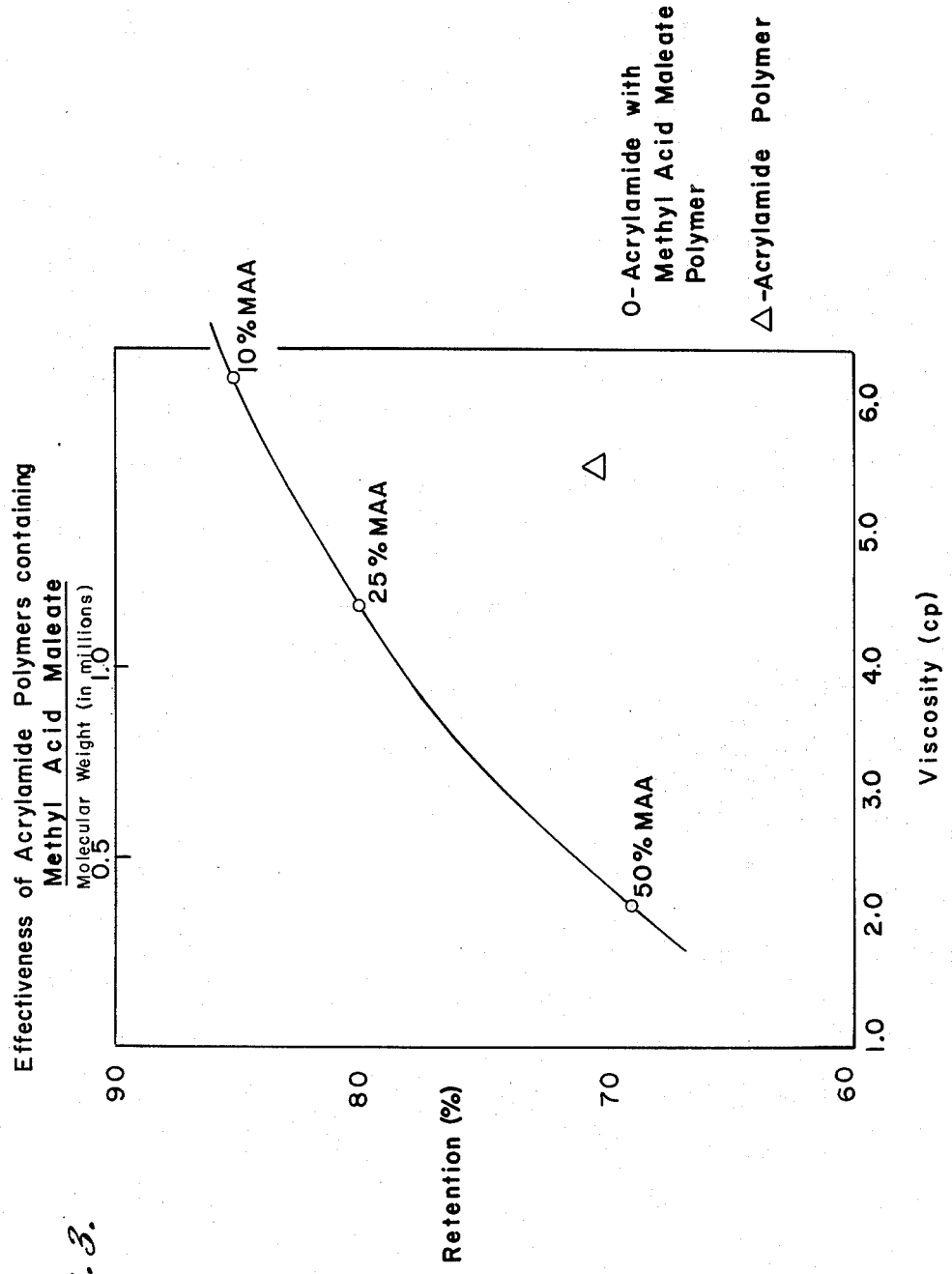

3,201,304
FLOCCULATION OF CELLULOSE FIBER SLURRIES WITH ACRYLAMIDE COPOLYMER
Francis S. Munjat, Philadelphia, Pa., assignor to E. F. Houghton & Co., Philadelphia, Pa., a corporation of Pennsylvania
Filed Feb. 16, 1961, Ser. No. 89,794
11 Claims. (Cl. 162—168)

The present invention relates to flocculants and methods of making the same and to methods of flocculating cellulose slurries.

A purpose of the invention is to produce an improved flocculant which will accelerate coagulation, agglutination and sedimentation.

A further purpose is to improve the pigment retention in paper-making.

A further purpose is to promote filtration.

A further purpose is to copolymerize in water between 40 and 95% of a water soluble acrylamide having the formula:

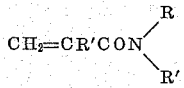

where

R is selected from the class consisting of hydrogen, methyl and ethyl; and
R' is selected from the class consisting of hydrogen and methyl;
with between 5 and 60% of a water soluble acid ester having the formula:

where

X is selected from the class consisting of partial maleate, partial fumarate and partial itaconate radicals;
R² is selected from the class consisting of methyl, ethyl, isopropyl, propyl, butyl,

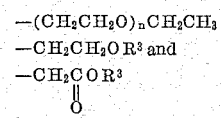

$n$ is a numeral selected from the class between 1 and 7, both inclusive; and
R³ is selected from the class consisting of methyl, ethyl, isopropyl, propyl and butyl;

at a temperature between 0 and 130° C. and at a pH between 2 and 6 so as to obtain a solution in which the molecular weight of the solid copolymer is in the range between 250,000 and 2,000,000.

A further purpose is to use a concentration of methyl acid maleate or the like in the range between 15 and 44% by weight, so as to get very effective retention with low molecular weight.

A further purpose is to react the flocculant with a metal hydroxide of the first (alkali), second (alkaline earth) or third (aluminum) group.

Further purposes appear in the specification and in the claims.

The drawings show graphs which are useful in explaining the invention.

FIGURE 1 plots volume of settled solids in milliliters against time in minutes for settling of pouch paper stock. This has about 25 pounds of pigment per ton of paper on a total active solids basis.

FIGURE 2 is similar to FIGURE 1 and illustrates the settling of highly pigmented paper stock. This has about 175 pounds of pigment per ton on a total active solids basis.

FIGURE 3 plots retention in percent against viscosity in cp for acrylamide polymer and various copolymers of acrylamide and methyl acid maleate.

Flocculants are widely used in the art to promote settling and cause agglomeration or agglutination.

The present invention is concerned with the production of an improved flocculant which will be more effective in promoting settling and will aid in the retention of solids, for example in the retention of pigment in paper-making.

The invention is believed to have wide application in promoting flocculation of cellulose material suspended in water, such as paper stock, fiberboard stock, hardboard stock and felt materials, and to promote the liberation of fiber on a paper-making machine.

The invention is also applicable to promoting pigment retention in paper-making and the like.

The invention may be used with other sedimentation aids, as for example, with alum or aluminum sulphate which is commonly employed in a concentration of the order of 10 p.p.m. in paper-making and in industrial water systems.

The invention may also be used to flocculate other dispersions, such as natural or synthetic rubber latex, sewage, and dispersions of ores in flotation. The invention will also aid in maintaining the fluidity of hydraulic cements and oil well drilling muds by the retention of water in the mixture employed.

A flocculating effect will vary from stringent to mild, with the amount and molecular weight of the water soluble ester employed. The effect is greatest at the higher concentrations of acids (say 15 to 44% by weight) and in this case the flocculant is very convenient to use because it is of low molecular weight.

The copolymer of the invention is produced in water, and may be a viscous liquid or a solid. Initially it is of rather high viscosity and will suitably be diluted in water to feed it conveniently to a solids concentration of the order of 0.05% in the preferred embodiment. The copolymer of the invention may, however, be dried and fed dry.

In normal use, as for example in paper-making or in the other applications referred to, the feed will be in the range between 5 to 20 p.p.m. of solids, which in terms of paper-making practice will preferably be from 2 to 4 pounds per ton on a total active solids basis. The most effective pH ranges in the finished composition will be from pH 4 to 6 and preferably from 4.6 to 5.

The flocculant remains stable, and the solids are either soluble or completely miscible with water and do not tend to settle out in stirring. The concentrated composition which may be sold may have a solids content as high as 25% by weight.

In order to produce the composition of the invention, I copolymerize two different components in the presence of water.

The first component making up from 40 to 95% of the total solids weight is a water soluble acrylamide having the formula:

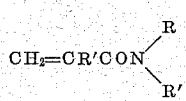

where

R is selected from the class consisting of hydrogen, methyl and ethyl; and
R' is selected from the class consisting of hydrogen and methyl.

Suitable examples are acrylamide, methacrylamide, N-methyl acrylamide, and N-N-dimethyl acrylamide.

The other component which is copolymerized is from 5 to 60% by weight of the total solids of a water soluble acid ester having the formula:

$$XR^2$$

where

X is selected from the class consisting of partial maleate, partial fumarate and partial itaconate radicals;

$R^2$ is selected from the class consisting of methyl, ethyl, isopropyl, propyl and butyl,

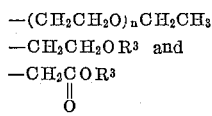

$n$ is a numeral selected from the class between 1 and 7 both inclusive;

$R^3$ is selected from the class consisting of methyl, ethyl, isopropyl, propyl and butyl.

Examples of the water soluble acid maleate or the like are as follows:

Methyl acid maleate
Methyl acid fumarate
Methyl acid itaconate
Ethyl acid maleate
Ethyl acid fumarate
Ethyl acid itaconate
Propyl acid maleate
Butyl acid maleate
Polyglycol acid maleate
Polyglycol acid fumarate
Ethylene glycol methyl ether acid maleate
Ethylene glycol methyl ether acid fumarate
Propyl glycol methyl ether acid maleate
Cellosolve acid maleate The flocculant if desired will be reacted with a metal hydroxide of the first (alkali), second (alkaline earth) or third (aluminum) group, such as sodium, potassium, lithium, calcium, barium, strontium or aluminum hydroxide.

The quantity of water used should be between 95 and 50% by weight. Instead of water, up to 50% of the volume can be replaced by a lower aliphatic alcohol such as methyl, ethyl, isopropyl, propyl or butyl alcohol.

The reaction is carried at a temperature between 0 and 130° C. When operating at atmospheric pressure the temperature is in the range between 0 and 100° C. and preferably 30 to 80° C. When operating at superatmospheric pressure, however, as in an autoclave, the temperature may be increased to 130° C.

The pH should be in the range between 2 and 6 and this will be controlled by the pH imparted by the methyl acid maleate or the like unless the pH is independently controlled.

A suitable catalyst or catalysts will be employed such as persulfates, for example sodium persulfate, perborates, for example sodium perborate, organic peroxide, such as t-butyl-hydroperoxide or the like.

When operating under the conditions referred to, the reaction should be stopped when a molecular weight in the range of 250,000 to 2,000,000 and preferably 500,000 is obtained for the copolymer.

EXAMPLE 1

In order to produce the flocculant of the invention, 75 grams of acrylamide and 75 grams of methyl acid maleate and 450 grams of deionized water are added to an autoclave along with 4 milliliters of a five part per million ferrous ion solution (for example, ferrous citrate), 0.010 gram of sodium perborate and 0.015 gram of sodium metabisulphite as catalysts.

The kettle is flushed with an inert gas such as nitrogen or carbon dioxide to remove oxygen. The reaction starts at 20° C. and with moderate stirring the temperature rises to 45° C. The reaction mixture is then heated at 55° C. for 1 hour after the exotherm ceases. The resultant product is a clear viscous solution. The specific viscosity is 2.10. The molecular weight is 500,000. The entire cycle takes 4 to 5 hours.

The flocculant of Example 1 is a translucent soft gel having a solids content of 25%. The time required to produce a 0.05% solution by dilution is approximately two and one-half hours.

The flocculant may, if desired, be dried and flaked.

EXAMPLE 2

The process of Example 1 is carried out, using 90 parts by weight of acrylamide and 10 parts by weight of methyl acid maleate. The reaction procedure carried out as in Example 1 results in a product which has a specific viscosity of 6.30. The specific viscosity for Example 2 corresponds to a molecular weight of the order of 1,500,000 which assures more rapid flocculating action.

EXAMPLE 3

The procedure of Example 1 is repeated, using methyl acid fumarate instead of methyl acid maleate. The product is essentially the same as that of Example 1.

EXAMPLE 4

The procedure of Example 2 is carried out using methacacid fumarate instead of methyl acid maleate. The product is the same as that of Example 2.

EXAMPLE 5

The procedure of Example 1 is carried out, using methacrylamide instead of acrylamide. The product has a molecular weight of the same order of magnitude as that of Example 1 but somewhat lower.

EXAMPLE 6

The procedure of Example 2 is carried out using methacrylamide instead of acrylamide. The product is less soluble than the product of Example 2, but is useful for the same purposes.

EXAMPLE 7

The procedure of Example 1 is carried out, using N-methyl acrylamide instead of acrylamide. The properties are similar to those obtained in Example 5.

EXAMPLE 8

The procedure of Example 1 is carried out, using N-N-dimethyl acrylamide instead of acrylamide. The product is comparable with that of Example 5 but has a tendency to be less soluble. This is especially so if the proportions of Example 2 are used.

EXAMPLE 9

The procedure of Example 1 is carried out, using diethylene glycol acid maleate instead of methyl acid maleate. The properties are similar to those obtained in Example 1.

EXAMPLE 10

The procedure of Example 2 is carried out, using diethyleneglycol acid maleate instead of methyl acid maleate. The product is similar to that of Example 2.

EXAMPLE 11

The procedure of Example 1 is carried out, using ethylene glycol methyl ether acid maleate instead of methyl acid maleate. The product is similar to that of Example 1.

EXAMPLE 12

The procedure of Example 2 is carried out, using ethylene glycol methyl ether acid maleate instead of methyl acid maleate. The product is similar to that of Example 2.

EXAMPLE 13

The procedure of Example 1 is carried out, using propylene glycol methyl ether acid maleate instead of methyl acid maleate. The product has properties similar to that of the product of Example 1.

EXAMPLE 14

The procedure of Example 2 is carried out, using propylene glycol methyl ether acid maleate instead of methyl acid maleate. The properties are similar to those of the product of Example 2.

EXAMPLE 15

The procedure of Example 1 is carried out, using ethylene glycol ethyl ether acid maleate (Cellosolve) instead of methyl acid maleate. The molecular weight was somewhat lower than that obtained in Example 1.

EXAMPLE 16

The procedure of Example 2 is carried out, using ethylene glycol ethyl ether acid maleate instead of methyl acid maleate. The result is similar to that obtained in Example 2.

EXAMPLE 17

Th procedure of Example 1 was carried out, using ethyl acid maleate instead of methyl acid maleate. The product is less soluble than that obtained in Example 1. Solubility can be aided by incorporating an alcohol, such as lower aliphatic alcohols like methyl, ethyl, propyl, isopropyl or butyl to the extent of 50% by volume replacing water. In this case there is only a slightly lower molecular weight.

EXAMPLE 18

The procedure of Example 1 is carried out, using polyethylene glycol methyl ether acid maleate having a molecular weight of 450 instead of methyl acid maleate. The results were comparable to Example 1.

EXAMPLE 19

The procedure of Example 18 is carried out, only using polyethylene glycol methyl ether acid maleate having a molecular weight in one case of 650 and in the other case of 850. There was less flocculating with these higher molecular weight components, but there was comparatively higher pigment retention.

EXAMPLE 20

The procedure of Example 1 is carried out except that the maximum temperature is increased to 110° C. The results are similar except that the molecular weight of the product obtained is somewhat lower.

EXAMPLE 21

The procedure of Example 1 is carried out except that the maximum reaction temperature is 10° C. The molecular weight is increased, being of the order of 1,000,000 instead of 500,000. The time of reaction required is of the order of 10 hours.

EXAMPLE 22

The procedure of Example 1 is carried out, omitting the iron ion and using the perborate or a persulfate as a catalyst. It is desirable in this case to double the quantity of catalysts where iron ion is not present. The resultant product is slightly inferior to that of Example 1 in flocculation and pigment retention.

EXAMPLE 23

The procedure of Example 1 is carried out, using the sodium perborate as mentioned in Example 1, omitting the ferrous ion and incorporating an equivalent amount of reducing agent, for example sodium sulphite or sodium hyldrosulphite or any other suitable reducing catalyst as well known. The results are similar to those of Example 1.

EXAMPLE 24

The procedure of Example 1 is carried out, using as a catalyst 0.015 gram of tertiary butyl hydroperoxide instead of the ferrous ion and the sodium perborate mentioned in Example 1. The results obtained are comparable to those mentioned in Example 1.

EXAMPLE 25

The procedure of Example 1 is carried out, using 0.020 gram of benzoyl peroxide instead of the ferrous ion and the perborate. The product obtained is similar to that of Example 1.

EXAMPLE 26

The effectiveness of the flocculant of the invention as compared with acrylamide polymer alone, and with various proportions of methyl acid maleate to acrylamide, is shown by Table 1. In this table the viscosity was measured as described in U.S. Patent No. 2,909,508, column 2, line 49.

*Table 1*

| Polymer | | Viscosity cp. | Retention, percent |
|---|---|---|---|
| Acrylamide weight percent | Methyl acid maleate weight percent | | |
| 100 | 0 | 5.58 | 71 |
| 90 | 10 | 6.30 | 85 |
| 75 | 25 | 4.46 | 80 |
| 50 | 50 | 2.11 | 68 |
| 25 | 75 | 0.91 | 0 |

The test procedure is as follows:

A standard paper making pulp solution (as used in Table 5) is used and the weight of solids in 100 milliliters of this pulp solution at 77° F. is determined. Into a 2000 milliliter beaker is transferred sufficient of the pulp solution at 77° F. to contain 16 grams of solids. The pH of the pulp solution is adjusted to 4.6±0.1 by the dropwise addition of alum solution while the pulp solution is stirred by hand with a glass stirrer. Stirring is continued for at least three minutes after the last alum addition.

The adjusted pulp solution is transferred to a gallon jug and sufficient water at 77° F. is added to make a total volume of 3600 milliliters.

1500 milliliters of tap water at 77° F. is placed in a beaker and while stirring 1.2 milliliters of flocculant solution to be tested having a concentration of 0.05% solids is added dropwise and stirring continued for an additional three minutes. The gallon jug is shaken vigorously and 450 milliliters of the pulp solution is transferred to a second beaker.

While stirring the pulp solution by hand, 1500 milliliters of water containing the flocculant is added to the pulp solution and gentle hand stirring continued for three minutes. The contents of the beaker is transferred to the water tank of a pulp mold, the tank containing 10 liters of water at 77° F. The contents are agitated eight times with the plunger and then drained.

The mat is removed from the screen and the hand sheet made in the usual manner, and then the ash of the hand sheet is determined by Standard Tappi methods.

A blank is run in exactly the same manner but omitting the addition of the flocculant solution. The percentage retention as given above is equal to the percent of ash of the paper prepared using the flocculant minus the percentage of ash of the blank, all divided by the percentage of ash of the blank and multiplied by 100.

It will be evident that the retention increased with addition of methyl acid maleate in the polymer up to about 44% of methyl acid maleate, notwithstanding that the viscosity was first higher then lower. The lower viscosity is very convenient.

FIGURE 3 shows these data, with molecular weights added.

EXAMPLE 27

The product of Example 1 is treated with a stoichiometric quantity of magnesium hydroxide based upon the acid group present, making the magnesium salt. There is improved hydraulic stability as determined by heat aging tests over a one week period at 120° F. It requires about 10% more acrylamide to provide the same order of effectiveness of flocculation with the magnesium salt as compared to the material of Example 1.

Salts can be made using any of the alkali metals such as sodium, potassium, lithium or ammonium, any of the alkaline earth metals such as calcium, strontium, barium or magnesium or any of the third group of metals such as aluminum. The bivalent ions are preferable to the monovalents, the effectiveness increasing in the general order of valence.

The pH of the product should not exceed 8, and the stoichiometric proportions of metal hydroxide should accordingly be choesn to limit the free hydroxyl groups, if any, in the product.

UTILIZATION OF THE FLOCCULANT

A flocculant according to the invention, produced according to Example 1, was compared with a standard commercial polyacrylamide flocculant with a specific viscosity of 5.58 (Separan NP–10 of Dow Chemical Company). The properties were compared for flocculating operations and agglomerating suspensions which would render the material of the invention suitable for paper-making, water treatment, mining, sewage treatment, treatment of industrial wastes and use of hydraulic cements.

The settling rate from the standpoint of paper-making was compared, using paper stock with a loading or pigmentation of 25 pounds per ton of paper on an active solids basis (so-called pouch paper stock of Riegel Paper Company) at pH 5, feeding 0.8 pound per ton of flocculant on a total active solids basis, at a consistency of 0.1% and a temperature of 25° C. The consistency of 0.1% was used to facilitate the measurement of settling rates. The pH-adjusted and diluted stock was placed in a series of 500 milliliter cylinders and the flocculants added in the form of a 0.05% solution. Each solution was thoroughly mixed and then the time of settling was noted and the clarity of the solution after settling was noted as set forth in Table 1a. The average of several tests showed that the flocculant of Example 1 produced a solution that was as clear as the standard (polyacrylamide).

Figure 1 plots the results and it will be evident that the product of Example 1 has an initial settling rate somewhat faster than that of the standard. Table 2 gives the average volume of settled solids.

Similar tests were carried out using a highly pigmented paper stock having 175 pounds of pigment per ton of paper stock on a total active solids basis (Sno-Paque paper stock of Riegel Paper Company).

The pH was adjusted to 4.4 with alum and the consistency was 0.1%. The quantity of flocculant used was 0.6 pound per ton of stock on a total active solids basis. The average of several tests showed that the product of Example 1 gave the same degree of clarity as the same standard and the initial settling rate was somewhat faster as indicated by Tables 3 and 4 and FIGURE 2.

Tests were then conducted on pigment retention during the formation of hand sheets (using High Bright paper stock of Champion Paper & Fiber Company). The results are given in Table 5 and Table 6. The increase in pigment retention was measured by ashing the sheets. The flocculant was employed at a concentration of 0.6 pound per ton on a total active solids basis using variable pH's as shown in Table 5. It will be evident from this table that the flocculant of Example 1 consistently gave a greater pigment retention than the standard. The effectiveness was greatest at pH values of 4.6 to 5, and the effectiveness diminished outside of the pH range of 4.6 to 5. Table 6 shows a pH in the range between 4.5 and 4.6 and employs various quantities of feed of the flocculant of Example 1 on a total active solids basis. Optimum results were obtained using a feed of 1.2 pounds per ton for the particular paper stock.

It is evident that the results obtained are influenced by a number of variables. The pH is significant. The use of alum is beneficial. Uniform distribution of the flocculant in the pulp is very important. For this reason it is very desirable to add the flocculant in a dilute solution preferably having a concentration of 0.05% or less. Very mild agitation is desirable so as not to destroy the flocs as they form. A mixing time of several minutes is required to promote uniform distribution.

Table 1a

[Pouch stock: pH 5.0; flocculant 0.8 pound per ton on a total active solids basis; consistency 0.1%; temperature 25° C.]

| Time, Min. | Volume of Settled Solids in Milliliters | | | | | | | | |
|---|---|---|---|---|---|---|---|---|---|
| | Blank | | | Example 1 | | | Standard | | |
| 0 | 500 | 500 | 500 | 500 | 500 | 500 | 500 | 500 | 500 |
| 5 | 455 | 445 | 460 | 440 | 430 | 430 | 455 | 435 | 420 |
| 10 | 425 | 395 | 420 | 385 | 370 | 350 | 405 | 370 | 350 |
| 15 | 395 | 360 | 385 | 345 | 320 | 300 | 365 | 320 | 300 |
| 20 | 375 | 335 | 365 | 315 | 290 | 270 | 335 | 290 | 265 |
| 25 | 355 | 315 | 350 | 300 | 275 | 255 | 315 | 275 | 245 |
| 30 | 345 | 305 | 340 | 290 | 265 | 240 | 300 | 265 | 235 |

Table 2

| Time, min. | Average Values of Volume of Settled Solids | | |
|---|---|---|---|
| | Blank, milliliters | Example 1, milliliters | Standard, milliliters |
| 0 | 500 | 500 | 500 |
| 5 | 453 | 433 | 437 |
| 10 | 413 | 363 | 375 |
| 15 | 380 | 322 | 328 |
| 20 | 357 | 292 | 297 |
| 25 | 340 | 277 | 278 |
| 30 | 330 | 265 | 267 |

Table 3.—Setting rates

[Sno-Paque stock: pH 4.4; flocculant 0.6 pound per ton on a total active solids basis; consistency 0.1%; temperature 25° C.]

| Time, min. | Volume of Settled Solids in Milliliters | | | | | |
|---|---|---|---|---|---|---|
| | Blank | | Example 1 | | Standard | |
| 0 | 500 | 500 | 500 | 500 | 500 | 500 |
| 5 | 360 | 410 | 315 | 340 | 320 | 390 |
| 10 | 270 | 320 | 220 | 255 | 220 | 280 |
| 15 | 215 | 260 | 185 | 210 | 185 | 225 |
| 20 | 205 | 220 | 170 | 190 | 165 | 200 |
| 25 | 195 | 200 | 160 | 175 | 160 | 180 |
| 30 | 195 | 185 | 155 | 165 | 150 | 170 |
| 60 | | 135 | | 130 | | 135 |
| 960 | 175 | | 140 | | 135 | |

Table 4

| Time, min. | Average Values of Volume of Settled Solids | | |
|---|---|---|---|
| | Blank, milliliters | Example 1, milliliters | Standard, milliliters |
| 0 | 500 | 500 | 500 |
| 5 | 385 | 327 | 355 |
| 10 | 295 | 238 | 250 |
| 15 | 235 | 197 | 205 |
| 20 | 212 | 180 | 183 |
| 25 | 198 | 168 | 170 |
| 30 | 190 | 160 | 160 |

*Table 5.—Pigment retention*

[High Bright stock: flocculant at 0.6 pound per ton on a total active solids basis; variable pH]

| pH | Total Ash, Percent | | | Gain in Ash, Percent | |
|---|---|---|---|---|---|
| | Blank | Example 1 | Standard | Example 1 | Standard |
| 4.0 | 9.4 | 11.7 | 11.6 | 24 | 23 |
| 4.6 | 5.8 | 8.5 | 8.1 | 48 | 41 |
| 5.0 | 6.0 | 8.8 | 7.9 | 47 | 32 |
| 5.6 | 5.8 | 7.4 | 7.3 | 27 | 25 |
| 6.2 | 5.9 | 7.4 | 6.7 | 24 | 13 |

*Table 6*

[High Bright stock: variable quantity of flocculant; pH 4.5–4.6]

| | Pounds per ton total active solids basis | Total ash, percent | Gain in ash, percent |
|---|---|---|---|
| Blank | | 6.2 | |
| Example 1 | 0.6 | 9.8 | 59 |
| Example 1 | 0.9 | 11.1 | 79 |
| Example 1 | 1.2 | 12.1 | 95 |

In view of my invention and disclosure, variations and modifications to meet individual whim or particular need will doubtless become evident to others skilled in the art, to obtain all or part of the benefits of my invention without copying the method and composition shown, and I, therefore, claim all such insofar as they fall within the reasonable spirit and scope of my claims.

Having thus described my invention what I claim as new and desire to secure by Letters Patent is:

1. A composition of matter comprising paper stock, a pigment and a flocculant essentially consisting of a copolymer in water, said copolymer having a molecular weight in the range between 250,000 and 2,000,000, said copolymer being the copolymer formed in water of between 40 and 95% of a water soluble acrylamide having the formula:

$$CH_2=CR'CON{\overset{R}{\underset{R'}{\diagdown}}}$$

where

R is selected from the class consisting of hydrogen, methyl and ethyl; and
R' is selected from the class consisting of hydrogen and methyl;

with between 5 and 60% of a water soluble partially esterified acid ester having the formula:

$$XR^2$$

where

X is selected from the class consisting of partial maleate, partial fumarate and partial itaconate radicals;
$R^2$ is selected from the class consisting of methyl, ethyl, isopropyl, propyl, butyl, $$-(CH_2CH_2O)_nR^3 \text{ and}$$

$n$ is a numeral selected from the class between 1 and 7, both inclusive; and
$R^3$ is selected from the class consisting of methyl, ethyl, isopropyl, propyl and butyl.

2. A composition of matter of claim 1, in which the flocculant contains between 15 and 44% of said water soluble acid ester.

3. A composition of matter of claim 1, in which the flocculant includes in combination a salt of a metal of the class consisting of the alkali metals, the alkaline earth metals and the metals of the third group of the periodic table.

4. A process of flocculating a slurry of cellulose fiber which comprises introducing into the slurry from 5 to 20 parts per million based on the solids content of a copolymer of between 40 and 95% of a water soluble acrylamide having the formula:

$$CH_2=CR'CON{\overset{R}{\underset{R'}{\diagdown}}}$$

where

R is selected from the class consisting of hydrogen, methyl and ethyl;
R' is selected from the class consisting of hydrogen and methyl;

with between 5 and 60% of a water soluble partially esterified acid ester having the formula:

$$XR^2$$

where

X is selected from the class consisting of partial maleate, partial fumarate and partial itaconate radicals;
$R^2$ is selected from the class consisting of methyl, ethyl, isopropyl, propyl, butyl, $$-(CH_2CH_2O)_nR^3$$
$$-CH_2\underset{\underset{O}{\|}}{C}OR^3$$

$n$ is a numeral selected from the class between 1 and 7, both inclusive; and
$R^3$ is selected from the class consisting of methyl, ethyl, isopropyl, propyl and butyl, said copolymer having a molecular weight between 250,000 and 2,000,000.

5. A process of claim 4, in which the preferred concentration of said acid ester is between 15 and 44%.

6. A process of claim 4, in which the copolymer has in combination a salt of a metal of the class consisting of alkali metals, alkaline earth metals and metals of the third group of the periodic table.

7. A process of flocculating a slurry of cellulose fiber, which consists of introducing into the slurry from 5 to 20 p.p.m. on the weight of the solids of a copolymer of between 40 and 95% of acrylamide and between 5 and 60% acid methyl maleate, said copolymer having a molecular weight between 250,000 and 2,000,000.

8. A process of flocculating a slurry of cellulose fiber, which comprises introducing into the slurry from 5 to 20 p.p.m. on the weight of the solids of a copolymer of between 40 and 95% of acrylamide and between 5 and 60% of acid polyglycol maleate, said copolymer having a molecular weight between 250,000 and 2,000,000.

9. A process of flocculating a slurry of cellulose fiber, which comprises incorporating in the slurry from 5 to 20 p.p.m. on the weight of the solids of a copolymer of between 40 and 95% of acrylamide and between 5 and 60% of acid ethylene glycol methyl ether maleate, said copolymer having a molecular weight between 250,000 and 2,000,000.

10. A process of flocculating a slurry of cellulose fiber, which comprises incorporating in the slurry from 5 to 20 p.p.m. on the weight of the solids of a copolymer of between 40 and 95% of acrylamide and between 5 and 60% of acid propylene glycol methyl ether maleate, said copolymer having a molecular weight between 250,000 and 2,000,000.

11. A process of flocculating a slurry of cellulose fiber, which comprises incorporating in the slurry from 5 to 20 p.p.m. on the weight of the solids of a copolymer of between 40 and 95% of acrylamide and between 5 and 60% acid ethylene glycol ethyl ether maleate, said copolymer having a molecular weight between 250,000 and 2,000,000.

References Cited by the Examiner

UNITED STATES PATENTS

| | | | |
|---|---|---|---|
| 2,625,471 | 1/53 | Mowry et al. | 71—1 |
| 3,019,157 | 1/62 | Reynolds et al. | 162—168 |
| 3,033,782 | 5/62 | Rauch et al. | 210—54 |
| 3,076,740 | 2/63 | Reynolds et al. | 162—168 |

FOREIGN PATENTS

| | | |
|---|---|---|
| 1,238,574 | 7/60 | France. |
| 883,973 | 12/61 | Great Britain. |

MURRAY TILLMAN, *Primary Examiner.*

DONALD ARNOLD, LOUIS J. BERCOVITZ,
*Examiners.*